(12) United States Patent
Watanabe (10) Patent No.: US 12,246,792 B2
(45) Date of Patent: Mar. 11, 2025

(54) DETACHABLE PEDAL UNIT FOR BICYCLE AND BICYCLE

(71) Applicant: VITAMIN-I FACTORY CO., LTD., Tokyo (JP)

(72) Inventor: Mikio Watanabe, Tokyo (JP)

(73) Assignee: VITAMIN I FACTORY CO., LTD., Tokyo (JP)

(*) Notice: Subject to any disclaimer, the term of this patent is extended or adjusted under 35 U.S.C. 154(b) by 610 days.

(21) Appl. No.: 17/622,199

(22) PCT Filed: Jun. 29, 2020

(86) PCT No.: PCT/JP2020/025523
§ 371 (c)(1),
(2) Date: Dec. 22, 2021

(87) PCT Pub. No.: WO2021/024647
PCT Pub. Date: Feb. 11, 2021

(65) Prior Publication Data
US 2022/0411013 A1    Dec. 29, 2022

(30) Foreign Application Priority Data
Aug. 8, 2019    (JP) ................................ 2019-146545

(51) Int. Cl.
*B62K 19/34*    (2006.01)
*B62H 7/00*    (2006.01)
(Continued)

(52) U.S. Cl.
CPC .............. *B62K 19/34* (2013.01); *B62H 7/00* (2013.01); *B62K 13/08* (2013.01); *B62K 19/24* (2013.01);
(Continued)

(58) Field of Classification Search
CPC ........ B62K 19/34; B62K 13/08; B62K 19/24; B62H 7/00; B62M 9/16
See application file for complete search history.

(56) References Cited

U.S. PATENT DOCUMENTS

| 651,907 A * | 6/1900 | Von Der Heide ..... B62K 19/34 474/116 |
| 2004/0201199 A1* | 10/2004 | Liebetrau ............... B62K 13/08 280/278 |

(Continued)

FOREIGN PATENT DOCUMENTS

| CN | 104890782 A * | 9/2015 |
| JP | 2002-106584 A | 4/2002 |

(Continued)

*Primary Examiner* — Jacob D Knutson
(74) *Attorney, Agent, or Firm* — H&I PARTNERS; Chai Im; C. Andrew Im (57) ABSTRACT

A training bicycle with a removably attachable pedal unit enabling adjustment of chain slack by a simple method is provided. The detachable pedal unit is configured to enable attachable/detachable connection of a pedal crank to a bicycle body. The pedal unit includes a unit body having a unit connector for rotatably retaining and fastening to a bicycle body a pedal crank axially supporting a chain wheel. A unit receiving member fixedly installed on the bicycle body to interconnect with the unit connector. A sliding adjustment mechanism provided on the unit receiving member and the unit connector to vary and fix mutual fore-aft connection position of the unit receiving member and the unit connector in order to adjust fore-aft connection position of the bicycle detachable pedal unit relative to the bicycle body and thereby adjusting the chain tension.

7 Claims, 10 Drawing Sheets

(51) Int. Cl.
*B62K 13/08* (2006.01)
*B62K 15/00* (2006.01)
*B62K 19/24* (2006.01)
*B62M 3/08* (2006.01)
*B62M 9/16* (2006.01)

(52) U.S. Cl.
CPC ............... *B62M 3/08* (2013.01); *B62M 9/16* (2013.01); *B62K 2015/001* (2013.01)

(56) References Cited

U.S. PATENT DOCUMENTS

2016/0375949 A1* 12/2016 Mondello ................ B62J 25/06
  280/7.15
2018/0339744 A1   11/2018 McFarland

FOREIGN PATENT DOCUMENTS

| | | | |
|---|---|---|---|
| JP | 2007-32307 A | | 2/2007 |
| JP | 2013147199 A | * | 8/2013 |
| JP | 3212384 U | | 9/2017 |

* cited by examiner

DETACHABLE PEDAL UNIT FOR BICYCLE AND BICYCLE

RELATED APPLICATIONS

This application is a § 371 application of PCT/JP2020/025523 filed Jun. 29, 2020, which claims priority from Japanese Patent Application No. 2019-146545 filed Aug. 8, 2019, each of which is incorporated herein by reference in its entirety.

TECHNICAL FIELD

The present invention relates to a bicycle detachable pedal unit and a bicycle equipped with the same.

BACKGROUND OF THE INVENTION

Training bicycles equipped with a detachable pedal unit have been developed and put to use. These are structured to enable attachment/detachment of a unit body part including a chain wheel and a pedal crank to/from a bicycle body by bolts or the like, thus allowing the pedal unit to be fastened or removed by means of bolts and nuts.

With this structure, a first-time bicycle rider can initially mount the bicycle with the unit body part removed to acquire steering skill and sense of balance while kicking the ground to move about, and then after attaining a degree of riding skill, the learner can mount the bicycle with the unit body part attached to the bicycle body to practice propelling the bicycle forward by pumping the pedals fastened to the pedal crank.

PRIOR ART DOCUMENTS

Patent Document

Patent Document 1: Japanese Patent Publication No. 2013-147199A

OBJECT AND SUMMARY OF THE INVENTION

Problem to be Overcome by the Invention

However, the aforesaid bicycle has a problem in that chain slack is difficult to adjust after the pedal unit is connected to the bicycle body. A training bicycle is particularly apt to incur frequent falls that result in the pedal unit repeatedly striking the ground, so that the problem of chain slackening is more apt to arise than with an ordinary bicycle.

The present invention was achieved in light of the aforesaid problem and has as its object to provide a training bicycle capable of pedal unit attachment/detachment that is adapted to enable adjustment of chain slack by a simple method.

Means for Solving the Problem

In order to achieve the aforesaid object, the bicycle detachable pedal unit according to the present invention, which is configured as a bicycle detachable pedal unit for attachably/detachably connecting a pedal crank to a bicycle body, comprises: a unit body having a unit connector for rotatably retaining and fastening to a bicycle body a pedal crank axially supporting a chain wheel; a unit receiving member fixedly installed on the bicycle body for interconnecting with the unit connector; and a sliding adjustment mechanism provided on the unit receiving member and unit connector for varying and fixing mutual fore-aft connection position of the unit receiving member and unit connector in order to adjust fore-aft connection position of the bicycle detachable pedal unit relative to the bicycle body and thereby adjust chain tension.

Further, the sliding adjustment mechanism comprises: a unit receiving member formed with receiving member side coupling holes and a unit connector formed with connector side coupling holes; and bolts passed through the receiving member side coupling holes and connector side coupling holes for screw-connecting the unit receiving member and the unit connector, wherein the receiving member side coupling holes and the connector side coupling holes form pairs of coupling holes constituting communicating holes formed at mutually corresponding positions and the pairs of communicating coupling holes are screw-connected by the bolts.

Moreover, in the pairs of coupling holes, at least one between the receiving member side coupling hole and the connector side coupling hole is formed as a long hole to enable sliding adjustment in fore-aft direction and the unit receiving member and unit connector are screw-connected by the bolts passed through the pairs of coupling holes, whereby the unit body can be slide-adjusted fore-aft along the long holes.

Further, in order to enable the sliding adjustment mechanism to finely adjust fore-aft position of the unit body relative to the bicycle body by pressure of a screw that advances with rotation, a screw-type adjuster is rotatably screw-fitted at a distal end portion of the unit connector so as to abut on the unit receiving member.

Further, in order to enable the sliding adjustment mechanism to finely adjust fore-aft position of the unit body relative to the bicycle body by pressure of a screw that advances with rotation, a screw-type adjuster is rotatably screw-fitted at a distal end portion of the unit receiving member so as to abut on the unit connector.

Further, the sliding adjustment mechanism is configured to comprise multiple pairs of coupling holes.

Moreover, the long holes of the individual pairs of coupling holes are formed parallel to one another and the formed locations of the pairs of coupling holes are varied with position in fore-aft direction.

A configuration of the sliding adjustment mechanism is adopted wherein one of two pairs of coupling holes is a pair of axis side coupling holes both of which are round and the other is a pair of swing-and-slide coupling holes coupling holes including a curved hole formed in roughly C-shape so as to arc about the axis side coupling holes and wherein the unit receiving member and unit connector are screw-connected by bolts passed through the axis side coupling holes and swing-and-slide coupling holes, whereby the unit body can slide along the swing-and-slide coupling holes by swinging around the axis side coupling holes.

Further, a configuration of the bicycle detachable pedal unit is adopted wherein either the unit receiving member or the unit connector is a plate-like member or a box-like member and the other thereof is a clamping member for clamping the plate-like member or box-like member.

In addition, the bicycle according to the present invention is configured to comprise the aforesaid bicycle detachable pedal unit.

Effects of the Invention

Since the present invention is configured as described above, it achieves effects such as the following:

1. Owing to the provision of the bicycle detachable pedal unit, the pedal crank can be detachably attached to the bicycle body. And since the bicycle detachable pedal unit is configured to comprise the sliding adjustment mechanism, set position of the detachable pedal unit can be finely adjusted, thereby making it possible to maintain appropriate tension of the bicycle chain and also to prevent chain fall-off in the course of bicycle riding.

2. As the sliding adjustment mechanism is given a configuration that connects the unit connector and the unit receiving member by means of coupling holes formed in each, the detachable pedal unit can be reliably attached to and easily detached from the bicycle body.

3. Since at least one between the receiving member side coupling hole and the connector side coupling hole is formed as a long hole, the unit body can be slide-adjusted fore-aft along the long hole and the connection position can be adjusted by sliding in substantially horizontal direction.

4. The screw-type adjuster is rotatably screw-fitted at a distal end portion of the unit connector so as to abut on the unit receiving member, which configuration enables fine adjustment of fore-aft position of the unit body by pressure of a screw that advances with rotation.

5. A screw-type adjuster is screw-fitted at a distal end portion of the unit connector so as to abut on the unit receiving member, which configuration similarly enables fine adjustment of fore-aft position of the unit body by pressure of a screw that advances with rotation.

6. Since the sliding adjustment mechanism is formed with multiple pairs of coupling holes, the detachable pedal unit can be firmly fastened to the bicycle body in stable condition.

7. The long holes among the pairs of holes that form the respective coupling holes are formed parallel to one another, and since the set positions of the pairs of coupling holes are varied with position in fore-aft direction, the detachable pedal unit can be fastened to the bicycle body in more stable condition.

8. Since one of the two pairs of coupling holes is a pair of round holes and the other is configured to include a curved hole formed in C-shape, the unit body can be slid to swing around a round hole to thereby finely adjust the position of the unit body.

9. Since one between the unit receiving member and the unit connector is made a plate-like member or a box-like member and the other thereof is made a clamping member for clamping the plate-like member or box-like member, the bolted fastening of the unit connector and the unit receiving member can be reinforced to ensure stable fastening of the detachable pedal unit.

10. The detachable pedal unit structured as described in the foregoing can be applied to a bicycle of any size.

DETAILED DESCRIPTION OF THE EMBODIMENTS

Figure 1:
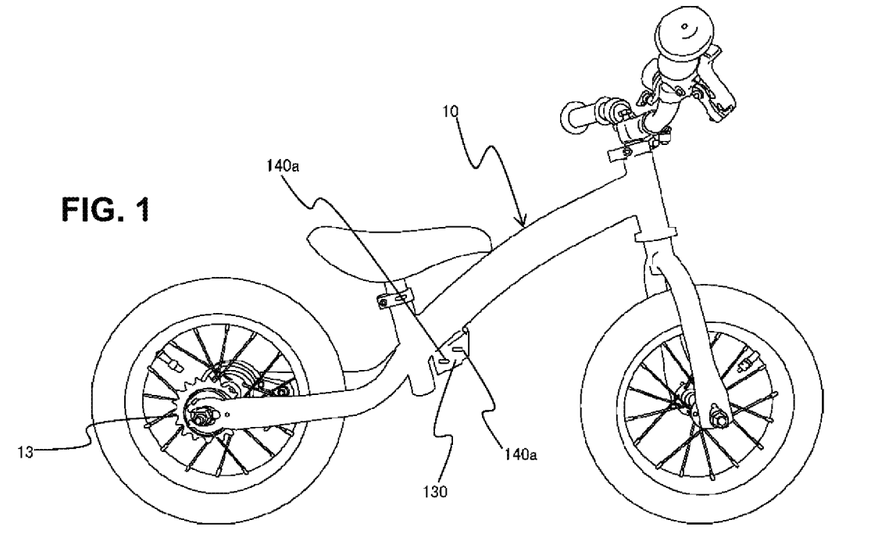
FIG. 1 is a side view of a bicycle to be installed with the bicycle detachable pedal unit according to the present invention.
Figure 2:
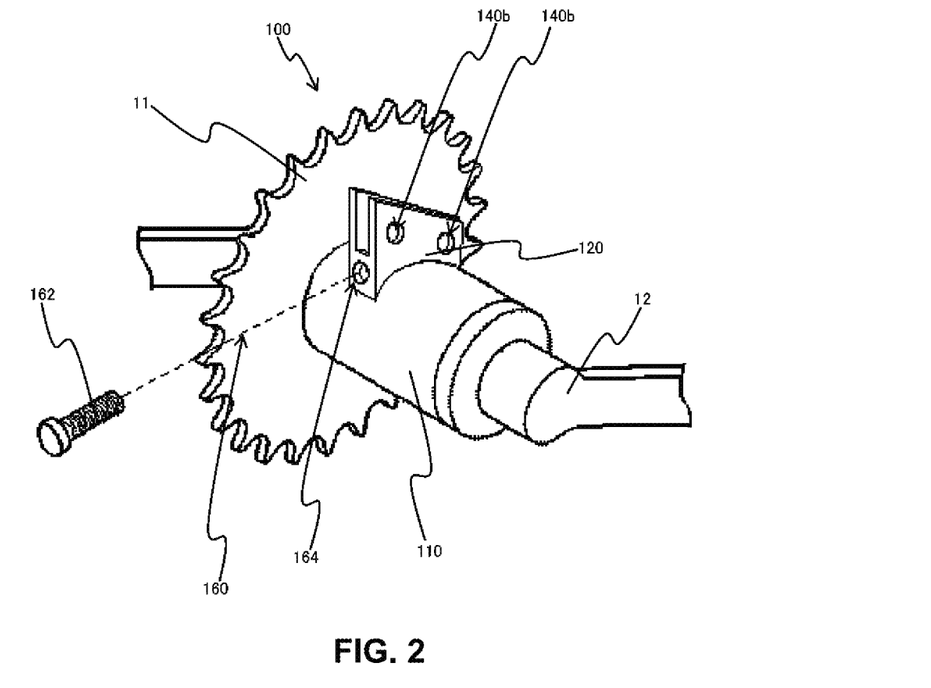
FIG. 2 is a perspective view of the unit body side of a bicycle detachable pedal unit.
Figure 3:
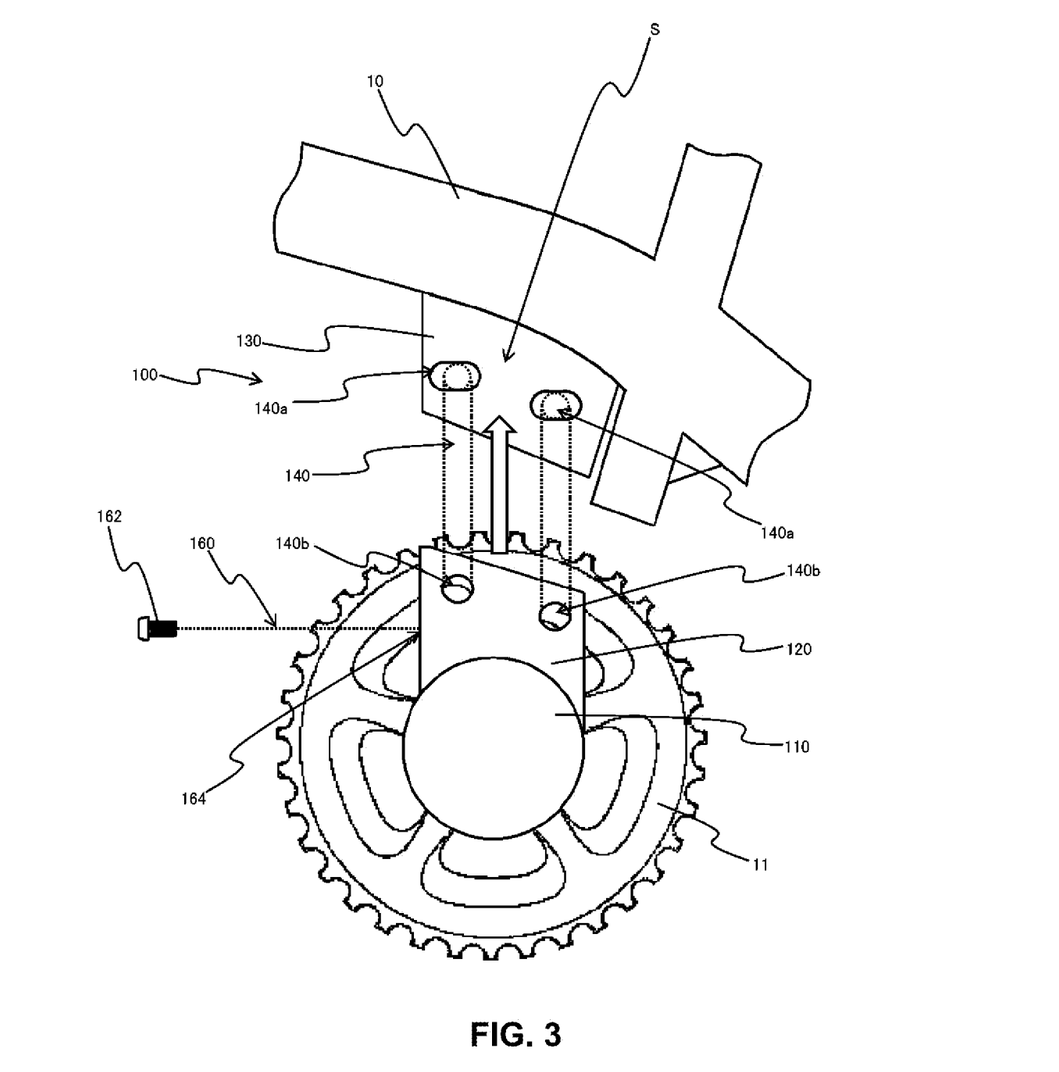
FIG. 3 is a side view of a bicycle detachable pedal unit whose unit receiving member side coupling side holes are formed as long holes.
Figure 4:
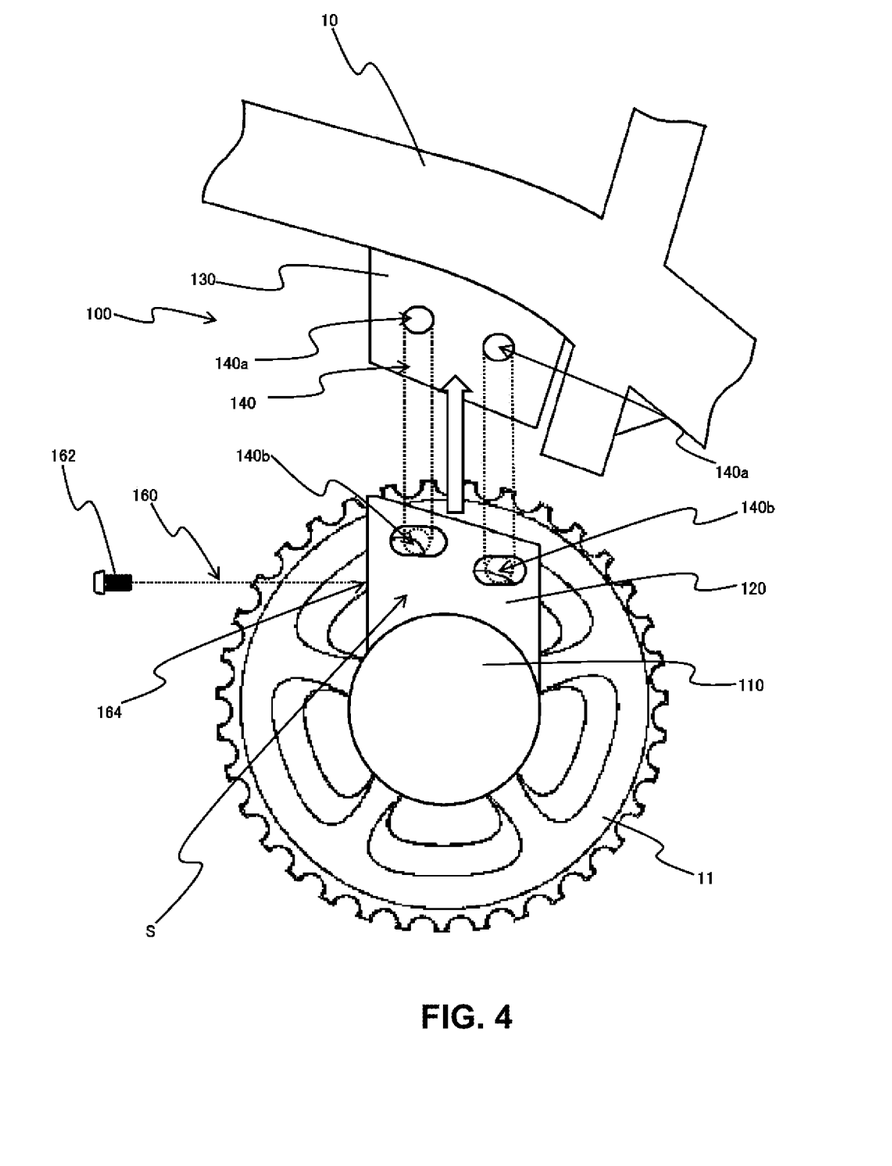
FIG. 4 is a side view of a bicycle detachable pedal unit whose unit connector coupling side holes are formed as long holes.

There now follows a detailed explanation of the bicycle detachable pedal unit according to the present invention, based on embodiments shown in the drawings. FIG. 1 is a side view of a bicycle to be installed with the bicycle detachable pedal unit according to the present invention, and FIG. 2 is a perspective view of the unit body side of a bicycle detachable pedal unit. FIG. 3 is a side view of a bicycle detachable pedal unit whose unit receiving member side coupling holes are formed as long holes, and FIG. 4 is a side view of a bicycle detachable pedal unit whose unit connector side coupling holes are formed as long holes.

Figure 5:
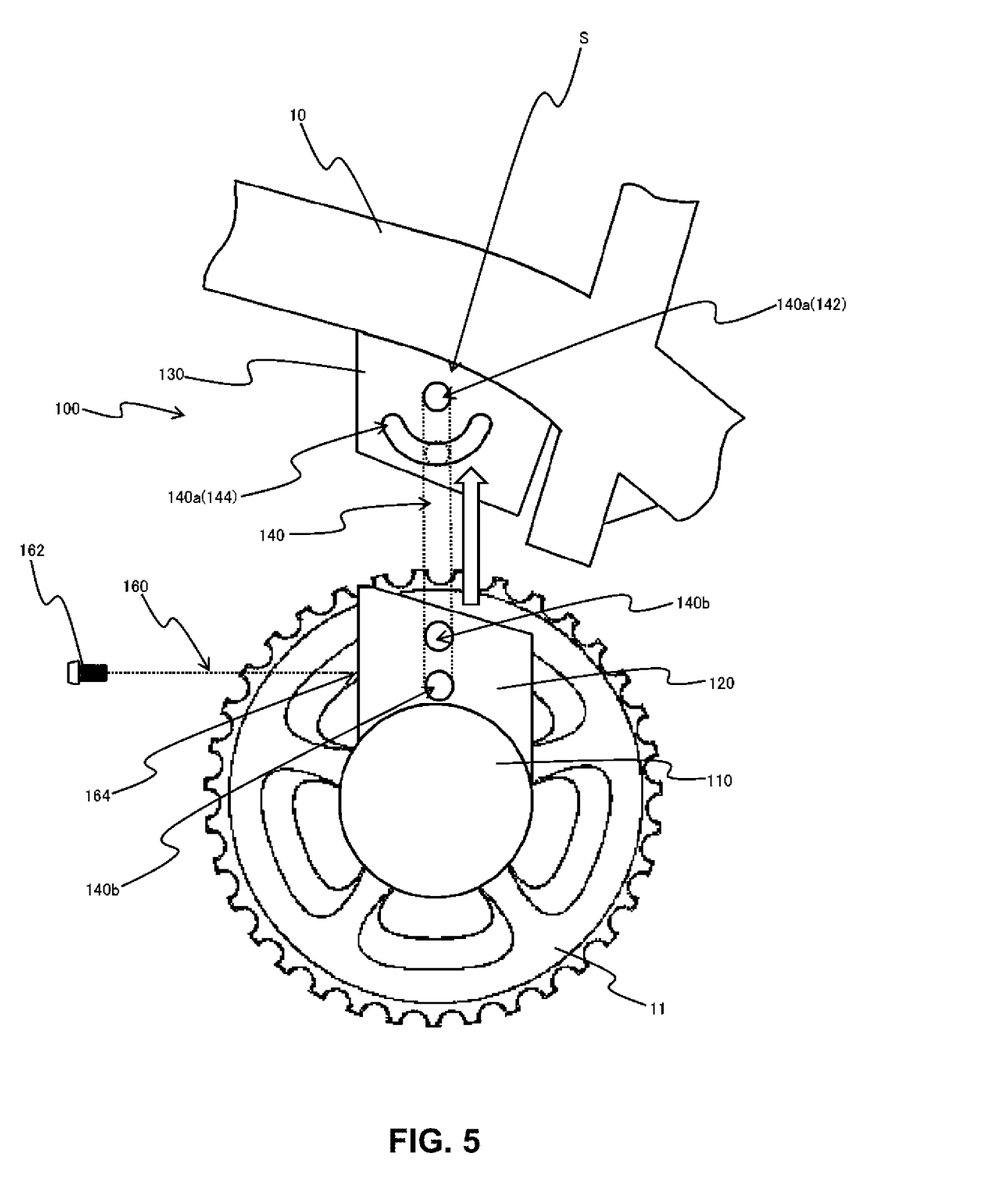
FIG. 5 is a side view of a bicycle detachable pedal unit whose unit receiving member side coupling holes are formed as swing-and-slide coupling holes.
Figure 6:
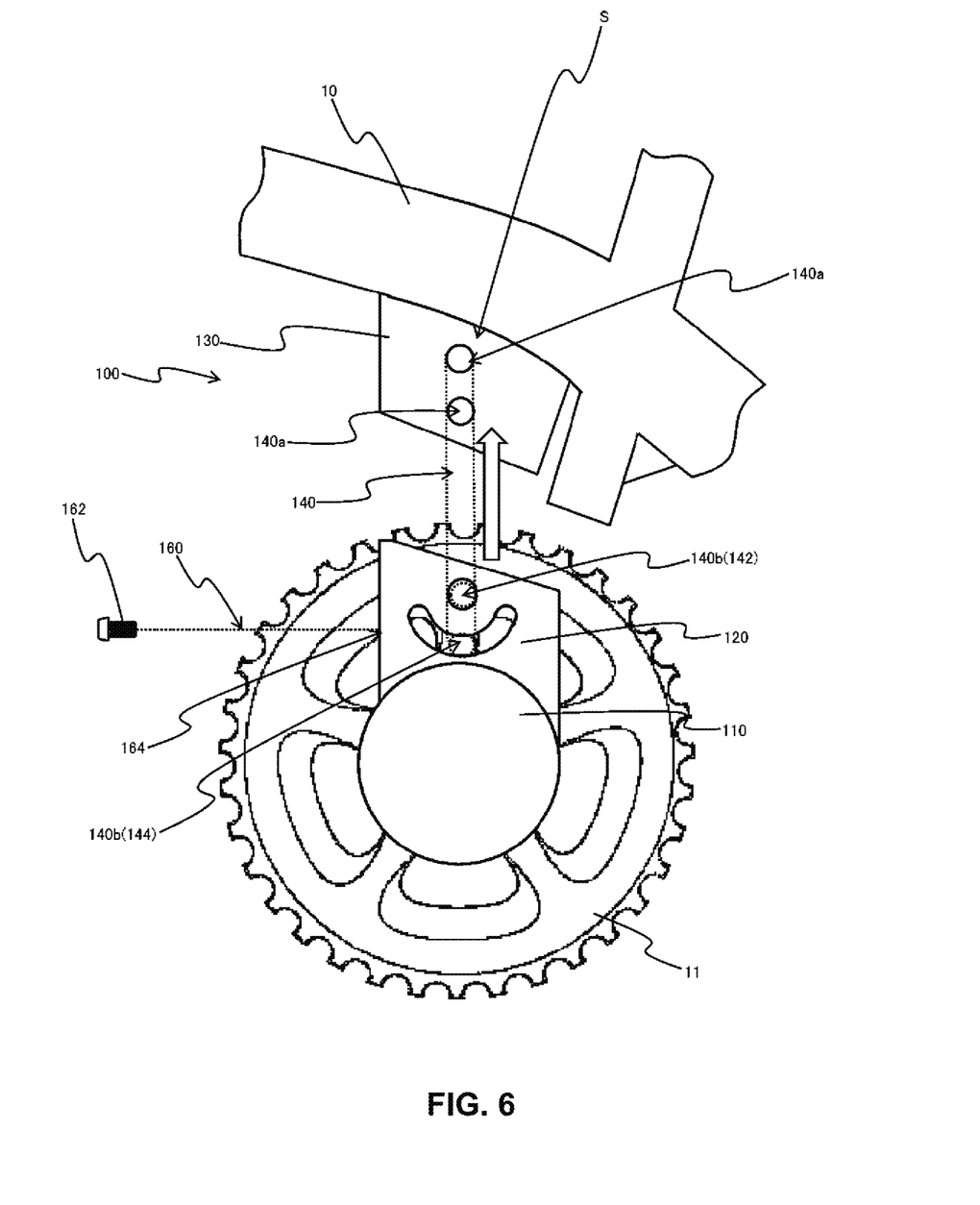
FIG. 6 is a side view of a bicycle detachable pedal unit whose unit connector side coupling holes are formed as swing-and-slide coupling holes.
Figure 7:
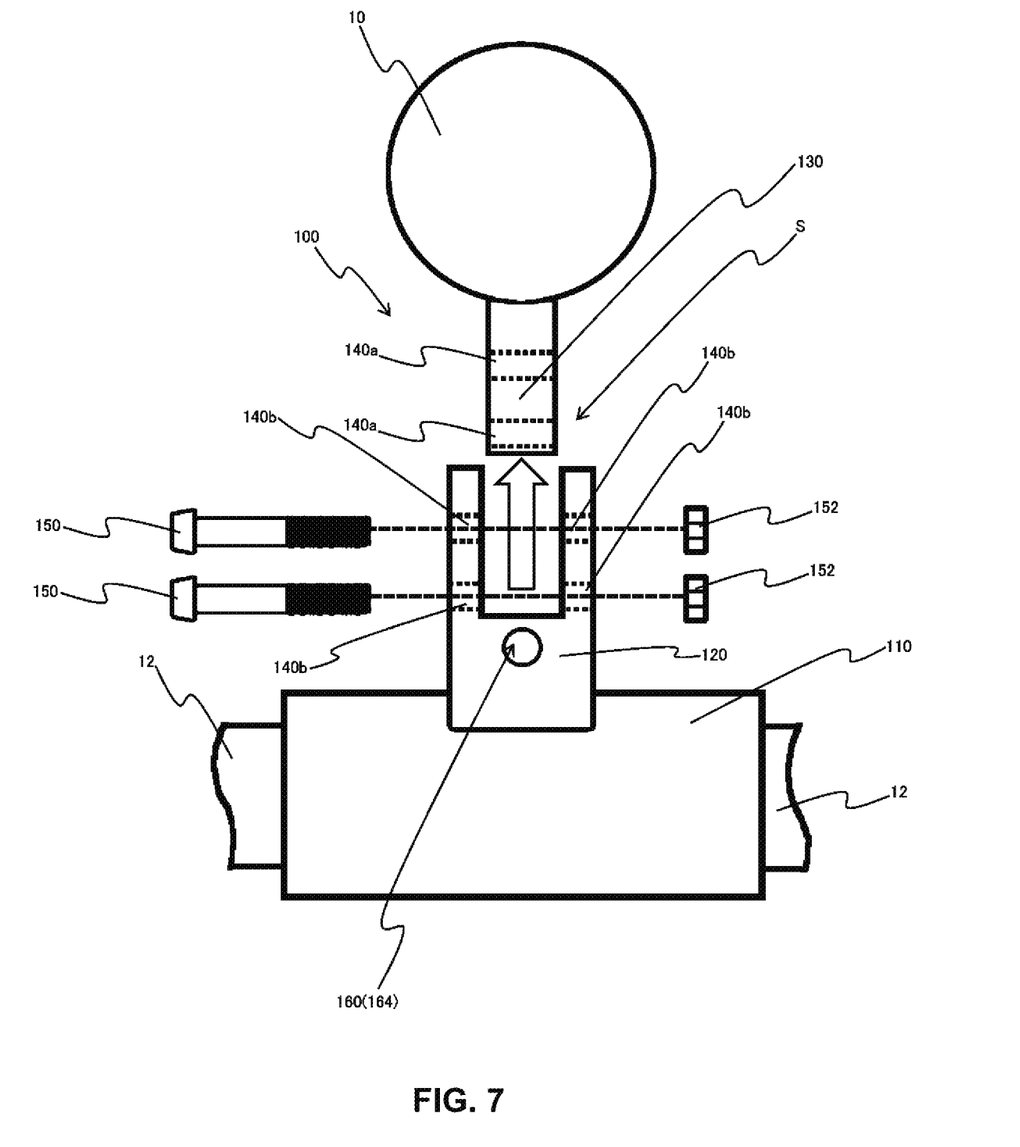
FIG. 7 is a front view of a bicycle detachable pedal unit whose unit connector side is structured as a clamping member.
Figure 8:
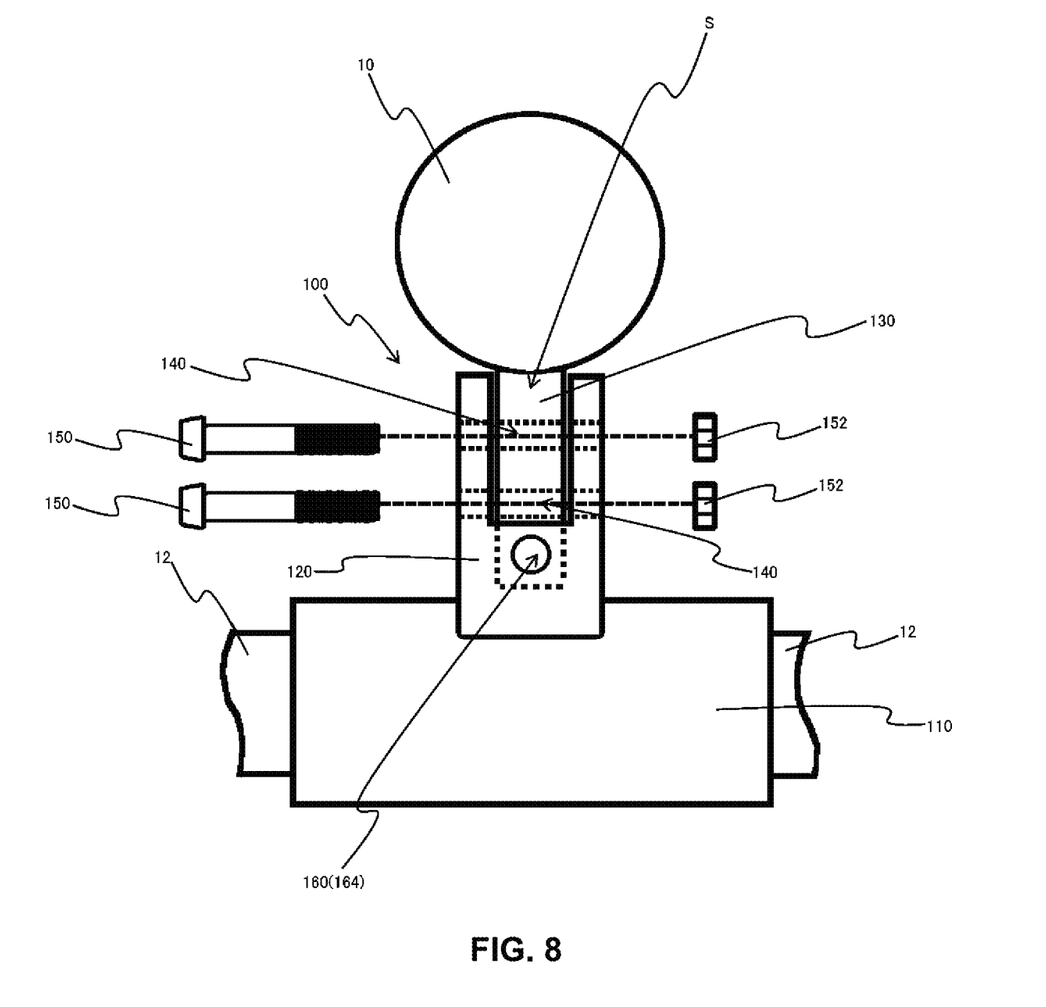
FIG. 8 is a front view of a bicycle detachable pedal unit whose unit connector side is structured as a clamping member.
Figure 9:
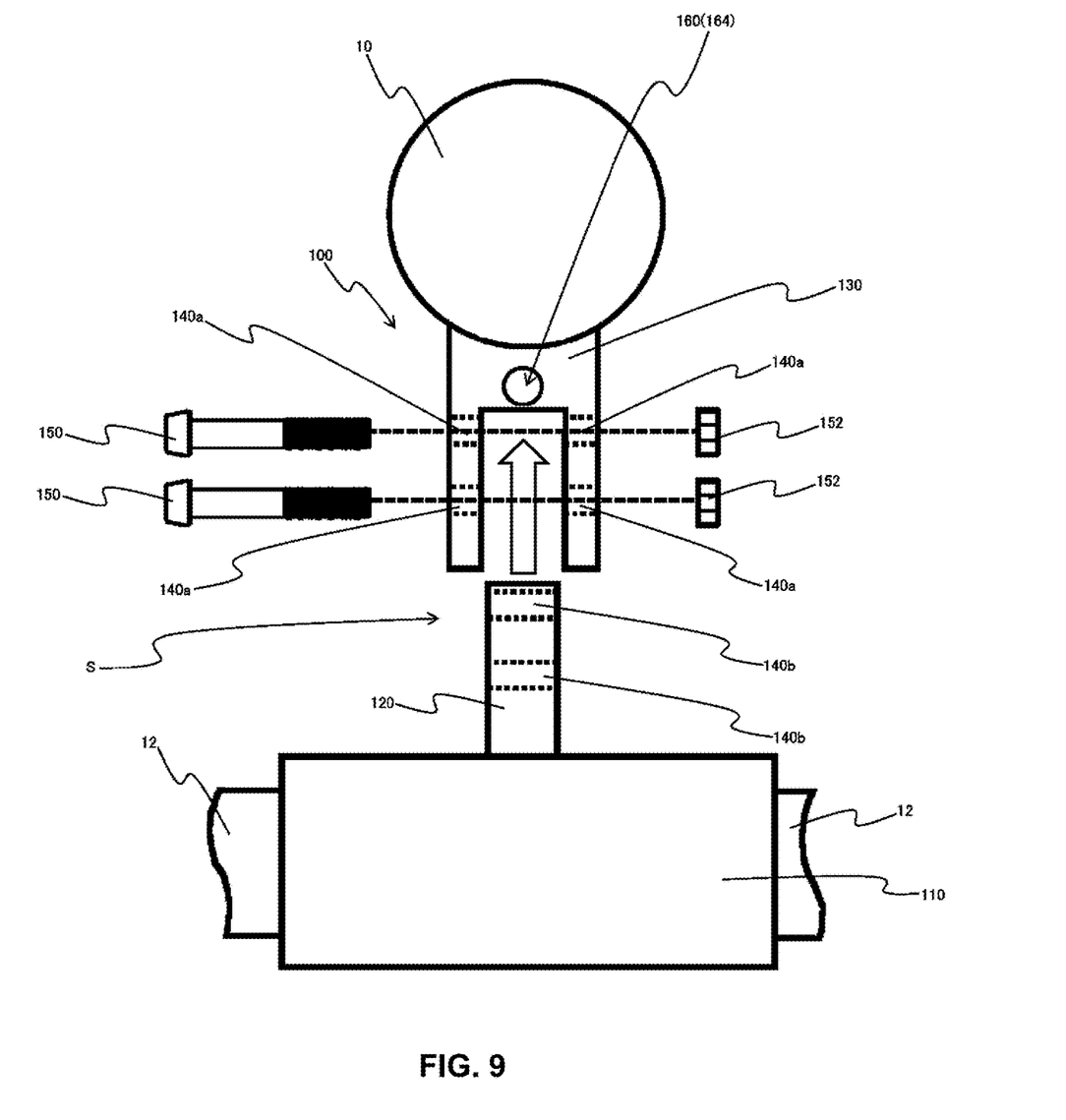
FIG. 9 is a front view of a bicycle detachable pedal unit whose unit receiving member side is structured as a clamping member.
Figure 10:
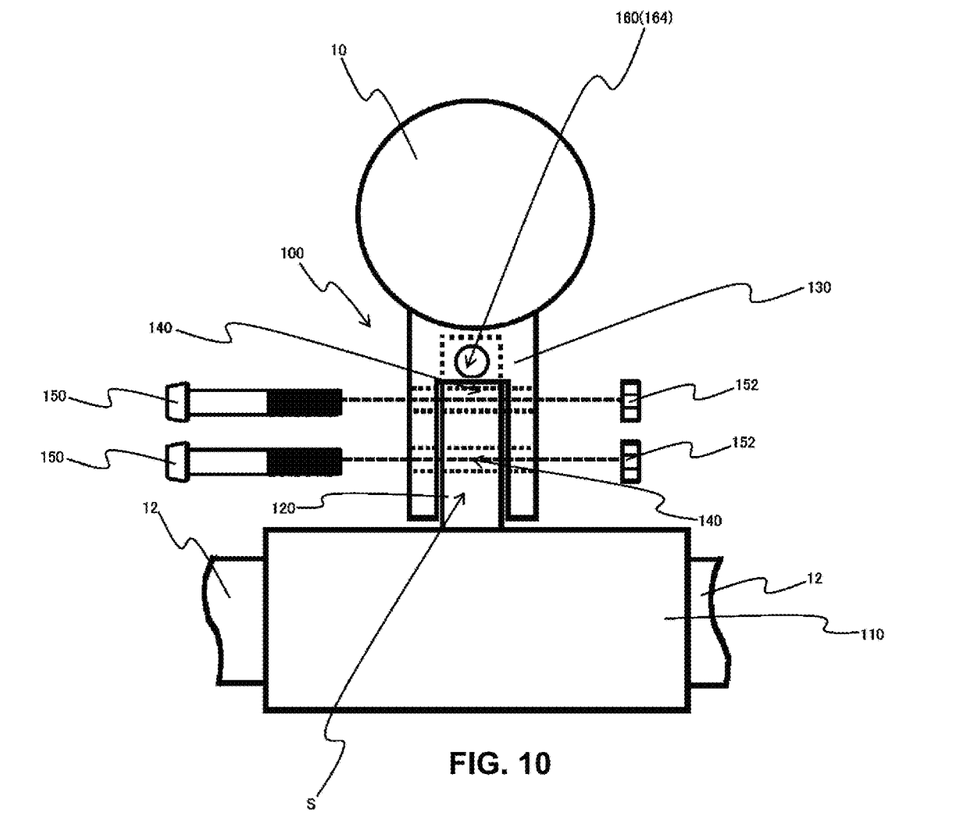
FIG. 10 is a front view of a bicycle detachable pedal unit whose unit receiving member side is structured as a clamping member.
Figure 11:
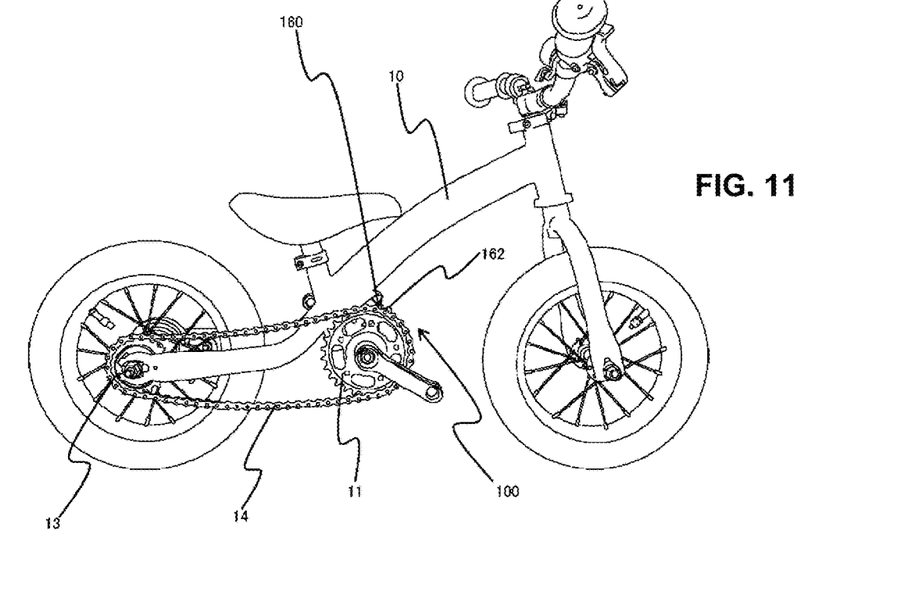
FIG. 11 is a side view of a bicycle body before adjustment using a screw-type adjuster.
Figure 12:
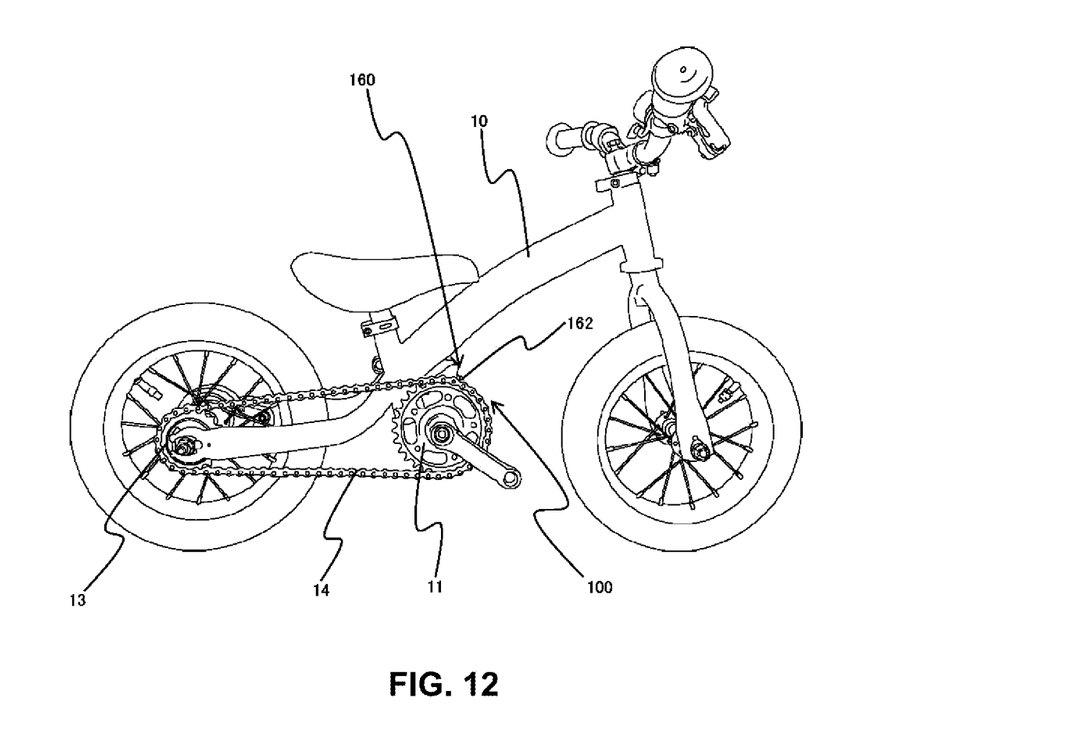
FIG. 12 is a side view of a bicycle body after adjustment using a screw-type adjuster.

Further, FIG. 5 is a side view of a bicycle detachable pedal unit whose unit receiving member side coupling holes are formed as swing-and-slide coupling holes, and FIG. 6 is a side view of a bicycle detachable pedal unit whose unit connector side coupling holes are formed as swing-and-slide coupling holes. FIG. 7 is a front view of a bicycle detachable pedal unit whose unit connector side is structured as a clamping member, shown prior to installation, and FIG. 8 is a front view of a bicycle detachable pedal unit whose unit connector side is structured as a clamping member, shown after installation. FIG. 9 is a front view of a bicycle detachable pedal unit whose unit receiving member side is structured as a clamping member, shown prior to installation, and FIG. 10 is a front view of a bicycle detachable pedal unit whose unit receiving member side is structured as a clamping member, shown after installation. FIG. 11 is a side view of a bicycle body before adjustment using a screw-type adjuster, and FIG. 12 is a side view of a bicycle body after adjustment using a screw-type adjuster.

As shown in FIG. 3 to FIG. 6, a bicycle detachable pedal unit 100 according to the present invention is a bicycle pedal unit comprising a unit body 110 having a unit connector 120, and a unit receiving member 130, wherein the unit connector 120 of the unit body 110, which includes a pedal crank, is detachably connected to the unit receiving member 130 fixedly connected to a bicycle body 10 so as to be positionally adjustable.

As shown in FIG. 2, the unit body 110 rotatably retains a pedal crank 12 axially supporting a chain wheel 11 and is a member to be connected to the bicycle body 10. As also shown in FIG. 2, the unit body 110 is equipped with the unit connector 120. The unit connector 120 is a member for connecting and fixing the unit body 110 on the bicycle body 10 and in this embodiment is, as explained later, configured to be connected to the unit receiving member 130 provided on the bicycle body 10.

In this embodiment, the unit connector 120 is welded to the unit body 110 but it is not limited to this structure and can instead be provided by integral molding. In this embodiment, the unit connector 120 is made of the same steel as the bicycle body 10 in the interest of ensuring strength, but it is not limited to such material and it is possible with a view to weight reduction to use aluminum, chromoly steel, carbon steel, titanium, resin or suitably choose from among other materials offering adequate strength.

As shown in the drawings, particularly FIG. 1 and FIG. 3, the unit receiving member 130 is installed at the middle of the bicycle body 10. The unit receiving member 130 is for interconnection with the unit connector 120 and in this embodiment is fixedly installed at the bottom of the frame of the bicycle body 10 (e.g., on the intersection of the bottom of the down tube and the seat tube, on the seat tube, on the top tube, or the like). At the time of installation, it can be fixedly installed at a desired location of the frame of the bicycle body 10, such as by fastening it solely to the top tube or fastening it to both the seat tube and the top tube, i.e., at two places.

As the unit receiving member 130 is a component where foot force on the pedals concentrates when a rider mounts the bicycle and pumps the pedals, it is desirably a sturdy member that is strongly connected to the bicycle body 10. In the present embodiment, the unit receiving member 130 is made of the same steel as the bicycle body 10 but it is not limited to such material and it is possible with a view to weight reduction to use aluminum, chromoly steel, carbon steel, titanium, resin or suitably choose from among other materials offering adequate strength. Moreover, while the unit receiving member 130 is welded to the bicycle body 10 in this embodiment, it is not limited to this structure and can instead be molded integrally with the frame of the bicycle body 10.

As shown in FIGS. 3 to 6, the unit receiving member 130 and unit connector 120 are equipped with a sliding adjustment mechanism S. The sliding adjustment mechanism S is an element for adjusting tension of a chain 14 threaded around the chain wheel 11 of the unit body 110 and a rear sprocket 13 by adjusting fore-aft connection position of the bicycle detachable pedal unit 100 relative to the bicycle body 10.

Once the unit body 110 is connected to the bicycle body 10 by connecting the unit receiving member 130 and unit connector 120, the sliding adjustment mechanism S can be operated to change, adjust and fix mutual fore-aft connection position of the unit receiving member 130 and unit connector 120, thereby facilitating adjustment of fore-aft position of the unit body 110 relative to the bicycle body 10.

Bicycle rear end structure has conventionally included a U-shaped cutout that enables the rear wheel axle to move forward and rearward relative to the bicycle body, and bicycle chain tension has been adjusted by fore-aft shifting the rear wheel axle fixed at the rear end section. However, the complexity of the rear wheel fore-aft fine adjustment structure makes the adjustment hard to perform, and the considerable labor required has given rise to the problem that changing the position of the axle relative to the bicycle body cannot be easily achieved. The sliding adjustment mechanism S of the present invention makes adjustment of bicycle chain 14 easy to perform by, as shown in FIGS. 11 and 12, simply sliding the unit body 110 of the bicycle detachable pedal unit 100, with the rear wheel remaining stationary.

The structure of the sliding adjustment mechanism S is described in detail in the following. As shown in FIGS. 3 and 4 and FIGS. 7 to 10, the sliding adjustment mechanism S comprises the fixedly connected unit receiving member 130 and unit connector 120. The unit receiving member 130 is formed with receiving member side coupling holes 140a and the unit connector 120 is formed with connector side coupling holes 140b. In addition, the unit receiving member 130 and the unit connector 120 are overlaid with the receiving member side coupling holes 140a and connector side coupling holes 140b in alignment to form communicating holes and fastened by means of bolts 150.

The receiving member side coupling holes 140a and the connector side coupling holes 140b are formed at mutually corresponding positions of the unit receiving member 130 and the unit connector 120. So once the unit connector 120 is fitted on the unit receiving member 130, the receiving member side coupling holes 140a and the connector side coupling holes 140b register to configure communicating holes that define pairs of coupling holes 140. A configuration that connects the unit body 110 to the bicycle body 10 is obtained by screwing the bolts 150 through and fastening the pairs of communicating coupling holes 140. The present embodiment adopts a configuration that, for example, fastens by screwing the bolts 150 into threaded coupling holes, but, as indicated in FIGS. 7 to 10, a configuration can be adopted that fastens by screwing the bolts 150 into nuts 152.

Next follows an explanation of the sliding adjustment structure of the sliding adjustment mechanism S. A configuration is adopted wherein at least one between the receiving member side coupling hole 140a and the connector side coupling hole 140b of each of the pairs of coupling holes 140 is elongated to enable sliding adjustment in the fore-aft direction. In this embodiment, as shown in FIGS. 3 and 4, either the receiving member side coupling holes 140a or the connector side coupling holes 140b are formed as round holes, while the holes of the other are formed oval (elliptical) to enable sliding adjustment in substantially horizontal direction. However, the configuration is not limited to this and the shape and location of the individual holes can be suitably modified and established to enable sliding adjustment.

The unit receiving member 130 and the unit connector 120 are fastened together by screwing the bolts 150 through the pairs of coupling holes 140 formed as described above. Sliding adjustment using the sliding adjustment mechanism S can therefore be performed by sliding the unit body 110 forward or rearward along the long holes with the bolts 150 in loosened condition and then fastening the unit body 110 at the desired position by tightening the bolts 150. That said, while the present embodiment is configured to enable fore-aft movement of the unit body 110 by the length of the long holes, the fore-aft movement distance and range of movement varies depending on the shape of the long holes. Moreover, as stated earlier, a configuration can be adopted whereby the unit receiving member 130 and the unit connector 120 are fastened by screwing the nuts 152 onto the bolts 150.

As shown in FIGS. 3 and 4, the sliding adjustment mechanism S comprises a screw-type adjuster 160 rotatably screw-fitted at a distal end portion of the unit connector 120. In the present embodiment, the screw-type adjuster 160 comprises a screw 162 and a threaded screw hole 164 into which the screw 162 is rotatably screw-fitted, and the screw 162 is screwed into the threaded screw hole 164 formed in the distal end portion of the unit connector 120. When the screw 162 is advanced by turning, a tip portion of the screw 162 abuts on and pushes against the unit receiving member 130. Moreover, a screw hole (not shown) is cut into the unit receiving member 130 where the screw 162 abuts and the screw 162 enters the screw hole and pushes against the unit receiving member 130. As a result, the unit body 110 can be slid to thereby enable fine adjustment of the fore-aft position of the unit body 110 relative to the bicycle body 10 by pushing action of the screw 162 advancing with rotation.

Further, as shown in FIG. 8, a configuration can be adopted in which the screw-type adjuster 160 is rotatably screw-fitted in the distal end portion of the unit receiving member 130. In this embodiment, the screw-type adjuster 160 comprises the screw 162 and the threaded screw hole 164 in which the screw 162 is rotatably screw-fitted. When the screw 162 is screwed into the threaded screw hole 164 formed in the distal end portion of the unit receiving member 130 and advanced by turning, the tip portion of the screw 162 abuts on and pushes the unit connector 120. As a result, the unit body 110 can be slid, so that similarly to what was described above, fine adjustment of the fore-aft position of the unit body 110 relative to the bicycle body 10 can be achieved by pushing action of the screw 162 advancing with rotation.

The sliding adjustment mechanism S can be configured to comprise multiple pairs of coupling holes 140. Namely, the unit receiving member 130 and the unit connector 120 are formed with multiple receiving member side coupling holes 140a and corresponding connector side coupling holes 140b so as to form corresponding pairs of coupling holes 140. Although in this embodiment, as shown in FIGS. 3 and 4, two pairs of coupling holes 140 are formed, this is not a limitation and configurations formed with three or more or only one pair of coupling holes 140 are possible. The number of pairs of the coupling holes 140 can be appropriately decided based on size of the unit body 110, necessary strength, and required connection rigidity.

As shown in FIGS. 3 and 4, the long holes that form the coupling holes of the individual pairs of coupling holes 140 are formed parallel to one another and it is additionally possible to adopt a configuration in which the formed locations of the pairs of coupling holes 140 differ with position in fore-aft direction, namely, a configuration that changes the height at which the coupling holes 140 are formed. By adopting this configuration, the detachable pedal unit can be fastened to the bicycle body in more stable condition.

Other embodiments of the sliding adjustment mechanism S will be explained. As shown in FIGS. 5 and 6, a configuration of the sliding adjustment mechanism S is possible wherein one of two pairs of coupling holes 140 is a pair of axis side coupling holes 142 both of which are round and the other is a pair of swing-and-slide coupling holes 144 including a curved hole formed in roughly C-shape so as to arc about the axis side coupling holes 142.

In this embodiment, the unit receiving member 130 and the unit connector 120 are fastened by bolts 150 passed through the axis side coupling holes 142 and the swing-and-slide coupling holes 144. Moreover, as stated earlier, a configuration can be adopted whereby the unit receiving member 130 and the unit connector 120 are fastened by screwing nuts 152 onto the bolts 150. When this configuration is adopted, the unit body 110 can be swung around the axis side coupling holes 142 to slide along the swing-and-slide coupling holes 144, so that fine adjustment of the fore-aft position of the unit body 110 can be achieved by sliding the unit body 110 so as to swing around the round holes.

In the present embodiment, as shown in FIGS. 7 to 10, a configuration of the bicycle detachable pedal unit 100 is possible wherein either the unit receiving member 130 or the unit connector 120 is a plate-like member and the other thereof is a clamping member for clamping the plate-like member. Moreover, it is also possible to adopt a configuration wherein either the unit receiving member 130 or the unit connector 120 is a hollow box-like member and the other thereof is a clamping member for clamping the box-like member. Although the clamping member that clamps the plate-like or box-like member forming either the unit receiving member 130 or the unit connector 120 can be a member of U-shaped cross-section in this embodiment, it is not limited to this shape and any shape can be suitably selected and used insofar as capable of clamping. Moreover, the member constituting one or the other of the unit receiving member 130 and the unit connector 120 need not be box-like or plate-like but can, for example, be configured as a solid rectangular block.

There now follows an explanation of a method of attaching and detaching the bicycle detachable pedal unit 100 according to the present invention. As illustrated in FIGS. 3 to 6, 7 and 9, the unit body 110 shown in FIG. 2 is placed under a bicycle that, as shown in FIG. 1, is not installed with the unit body 110. Although not illustrated here, the chain 14 is threaded around the chain wheel 11 and the rear sprocket 13 in advance.

Next, as shown in FIGS. 8 and 10, the unit connector 120 is connected by sleeving onto or insertion into the unit receiving member 130 installed on the bicycle body 10. Then, as illustrated in FIGS. 8 and 10, the bolts 150 are screwed into the pairs of threaded coupling holes. Or the nuts 152 are screwed on the bolts 150 passed through the pairs of coupling holes. At this stage, the bolts are preferably lightly tightened to a temporarily fixed condition.

Next, as shown in FIGS. 2 to 6, the unit body 110 is finely adjusted by screwing the screw 162 of the screw-type adjuster 160 inward. By this, tension of the chain 14 can be adjusted. In other words, the loose chain 14 shown in FIG. 11 is imparted with moderate tension as shown in FIG. 12. Once the chain 14 achieves a moderately tense condition such as shown in FIG. 12, the bolts 150 (or bolts 150 and nuts 152) are firmly tightened. This results in a bicycle that is equipped with the bicycle detachable pedal unit 100 and whose chain 14 is moderately tensioned. When the chain 14 slackens in course of bicycle use, it can be restored to suitably tense condition by again loosening the bolts 150 (or bolts 150 and nuts 152) and using the screw-type adjuster 160 to adjust the connection position of the unit body 110.

The bicycle detachable pedal unit 100 can be installed on a training bicycle, for example. In the particular case of a child practicing bicycle riding, the child can practice with the bicycle detachable pedal unit 100 removed to first acquire sense of balance for bicycle riding while kicking the ground to move about, and then after achieving that, can use the bicycle with the bicycle detachable pedal unit 100 installed to master the techniques of propelling and operating the bicycle with pedal driving force, so that a child, for example, can easily practice bicycle riding with a single bicycle. In addition, when someone such as a child is to practice riding the bicycle with pedals attached, the set position of the detachable pedal unit installed on the bicycle can be finely adjusted to maintain proper tension of the bicycle chain and prevent the chain from falling off while the bicycle is being ridden, thereby increasing safety from injury and making safe bicycle riding available.

As a bicycle is particularly apt to fall over during training, the pedal unit is likely to repeatedly strike against the ground. As a result, chain slackening and chain fall-off are more likely to occur than with an ordinary bicycle. Regarding this point, the bicycle according to the present invention is better able to prevent rider injury and ensure safer bicycle riding because by finely adjusting the fore-aft set position of the bicycle detachable pedal unit 100 it is able to maintain bicycle chain tension and prevent chain fall-off in the course of bicycle riding. Up to now, moreover, occurrence of chain slackening has required the rear wheel to be removed and the chain refitted, which is time consuming and requires tools. In contrast, in the bicycle according to the present invention, chain tension can be adjusted simply by turning a screw (screw 162) using a simple tool such as a hexagonal wrench, so that chain slack can be taken up and time saved by a simple method.

EXPLANATION OF SYMBOLS

S Sliding adjustment mechanism
10 Bicycle body
11 Chain wheel
12 Pedal crank
13 Rear sprocket
14 Chain
100 Bicycle detachable pedal unit
110 Unit body
120 Unit connector
130 Unit receiving member
140 Pair of coupling holes
140*a* Receiving member side coupling hole
140*b* Connector side coupling hole
142 Axis side coupling hole
144 Swing-and-slide coupling hole
150 Bolt
152 Nut
160 Screw-type adjuster
162 Screw
164 Threaded screw hole

The invention claimed is:

1. A bicycle detachable pedal unit to removably attach a pedal crank to a bicycle body, comprising:
   a unit body comprising a unit connector to rotatably retain and fasten to a bicycle body a pedal crank axially supporting a chain wheel;
   a unit receiving member fixedly installed on the bicycle body to interconnect with the unit connector;
   a sliding adjustment mechanism installed on the unit receiving member and the unit connector to vary and fix a mutual fore-aft connection position of the unit receiving member and the unit connector in order to adjust a fore-aft connection position of the bicycle detachable pedal unit relative to the bicycle body and thereby adjusting a chain tension;
   wherein the unit receiving member is formed with receiving member side coupling holes and the unit connector is formed with connector side coupling holes, bolts passed through the receiving member side coupling holes and connector side coupling holes to screw-connect the unit receiving member and the unit connector;
   wherein the receiving member side coupling holes and the connector side coupling holes form pairs of coupling holes constituting communicating coupling holes formed at mutually corresponding positions and the pairs of communicating coupling holes are screw-connected by the bolts; and
   wherein the sliding adjustment mechanism adjusts a fore-aft position of the unit body relative to the bicycle body by a pressure exerted by a screw that advances with rotation, a screw adjuster is rotatably screw-fitted at a distal end portion of the unit connector so as to abut on the unit receiving member.

2. The bicycle detachable pedal unit of claim 1, wherein at least one of the pairs of coupling holes between the receiving member side coupling hole and the connector side coupling hole is formed as a long hole to enable sliding adjustment in a fore-aft direction; and wherein the unit receiving member and unit connector are screw-connected by the bolts passed through the pairs of coupling holes, whereby the unit body can be slide-adjusted fore-aft along the long holes.

3. The bicycle detachable pedal unit of claim 1, wherein the sliding adjustment mechanism comprises the pairs of coupling holes.

4. The bicycle detachable pedal unit of claim 3, wherein long holes of the pairs of coupling holes are formed parallel to one another and formed locations of the pairs of coupling holes are varied with position in the fore-aft direction.

5. The bicycle detachable pedal unit of claim 1, wherein one of the pairs of coupling holes is a pair of axis side coupling holes, both of which are round and the other is a pair of swing-and-slide coupling holes comprising a curved hole formed in roughly C-shape so as to arc about the pair of the axis side coupling holes; and
   wherein the unit receiving member and unit connector are screw-connected by the bolts passed through the pair of the axis side coupling holes and the pair of the swing-and-slide coupling holes, whereby the unit body is slidable along the pair of the swing-and-slide coupling holes by swinging around the axis side coupling holes.

6. The bicycle detachable pedal unit of claim 1, wherein either the unit receiving member or the unit connector is a plate-like member or a box-like member, and the other thereof is a clamping member to clamp the plate-like member or box-like member.

7. A bicycle equipped with the bicycle detachable pedal unit of claim 1.

* * * * *